United States Patent

Moshayedi

(10) Patent No.: US 8,266,481 B2
(45) Date of Patent: Sep. 11, 2012

(54) SYSTEM AND METHOD OF WEAR-LEVELING IN FLASH STORAGE

(75) Inventor: Mark Moshayedi, Newport Coast, CA (US)

(73) Assignee: STEC, Inc., Santa Ana, CA (US)

( * ) Notice: Subject to any disclaimer, the term of this patent is extended or adjusted under 35 U.S.C. 154(b) by 429 days.

(21) Appl. No.: 12/511,994

(22) Filed: Jul. 29, 2009

(65) Prior Publication Data

US 2011/0029808 A1 Feb. 3, 2011

(51) Int. Cl.
*G06F 11/08* (2006.01)

(52) U.S. Cl. .................................................. 714/710

(58) Field of Classification Search .................. 714/710, 714/723, 764
See application file for complete search history.

(56) References Cited

U.S. PATENT DOCUMENTS

| | | | |
|---|---|---|---|
| 5,956,473 A | 9/1999 | Ma et al. | |
| 6,279,118 B1 * | 8/2001 | Kang | 714/6.32 |
| 6,384,999 B1 * | 5/2002 | Schibilla | 360/53 |
| 6,646,931 B2 * | 11/2003 | Mizoguchi et al. | 365/200 |
| 6,940,753 B2 * | 9/2005 | Cernea | 365/185.08 |
| 7,136,978 B2 | 11/2006 | Miura et al. | |
| 7,343,535 B2 * | 3/2008 | Lai | 714/724 |
| 7,430,693 B2 * | 9/2008 | Noguchi et al. | 714/710 |
| 7,447,936 B2 * | 11/2008 | Shiota et al. | 714/6.1 |
| 7,594,067 B2 | 9/2009 | Torabi | |
| 7,613,880 B2 | 11/2009 | Miura et al. | |
| 7,826,263 B2 * | 11/2010 | Lee et al. | 365/185.09 |
| 7,962,801 B2 * | 6/2011 | Cheng | 714/42 |
| 8,046,645 B2 * | 10/2011 | Hsu et al. | 714/723 |
| 8,069,396 B2 * | 11/2011 | Chen et al. | 714/763 |
| 2007/0233752 A1 | 10/2007 | Bangalore et al. | |
| 2008/0294935 A1 * | 11/2008 | Ni et al. | 714/6 |
| 2009/0055680 A1 * | 2/2009 | Honda et al. | 714/5 |
| 2009/0172255 A1 | 7/2009 | Yeh et al. | |
| 2009/0216936 A1 * | 8/2009 | Chu et al. | 711/103 |
| 2009/0271567 A1 | 10/2009 | Huang | |
| 2010/0023675 A1 | 1/2010 | Chen et al. | |
| 2010/0115186 A1 | 5/2010 | Chang et al. | |
| 2010/0115217 A1 * | 5/2010 | Oh et al. | 711/162 |
| 2011/0041005 A1 * | 2/2011 | Selinger | 714/6 |

* cited by examiner

*Primary Examiner* — James C Kerveros
(74) *Attorney, Agent, or Firm* — McDermott Will & Emery LLP (57) ABSTRACT

A flash storage device tracks performs wear-leveling by tracking data errors that occur when dynamic data is read from a storage block of the flash storage device and moving the dynamic data to an available storage block of the flash storage device. Additionally, the flash storage device identifies a storage block containing static data and moves the static data to the storage block previously containing the dynamic data.

20 Claims, 7 Drawing Sheets

| 200 Logical Block Address | 205 Physical Block Address |
|---|---|
| 200 Logical Block Address | 205 Physical Block Address |
| 200 Logical Block Address | 205 Physical Block Address |
| . . . | . . . |
| 200 Logical Block Address | 205 Physical Block Address |

FIG. 2

| 205 Physical Block Address | 300 Block Status Indicator | 305 Read Status Indicator | 310 Write Status Indicator | 315 Error Status Indicator | 320 Free Storage Block indicator |
|---|---|---|---|---|---|
| 205 Physical Block Address | 300 Block Status Indicator | 305 Read Status Indicator | 310 Write Status Indicator | 315 Error Status Indicator | 320 Free Storage Block indicator |
| 205 Physical Block Address | 300 Block Status Indicator | 305 Read Status Indicator | 310 Write Status Indicator | 315 Error Status Indicator | 320 Free Storage Block indicator |
| ... | ... | ... | ... | ... | ... |
| 205 Physical Block Address | 300 Block Status Indicator | 305 Read Status Indicator | 310 Write Status Indicator | 315 Error Status Indicator | 320 Free Storage Block indicator |

| 500<br>Virtual Block Address | 200<br>Logical Block Address |
|---|---|
| 500<br>Virtual Block Address | 200<br>Logical Block Address |
| 500<br>Virtual Block Address | 200<br>Logical Block Address |
| . . . | . . . |
| 500<br>Virtual Block Address | 200<br>Logical Block Address |

SYSTEM AND METHOD OF WEAR-LEVELING IN FLASH STORAGE

BACKGROUND

1. Field of Invention

The present invention generally relates to flash storage systems and devices, and more particularly to wear-leveling in flash storage systems and devices.

2. Description of Related Art

A typical flash storage device includes a controller that writes data to storage blocks of the flash storage device and reads data from these storage blocks. In a write operation to a storage block, the controller erases the storage block before data is written to that storage block. Eventually, after a sufficient number of erasures of the storage block, the storage block becomes defective and the controller replaces the defective storage block with a spare storage block in the flash storage device.

Wear in a storage block is determined by the number of erasures of the storage block. Some flash storage devices include a counter for each storage block for maintaining a count of erasures of the storage block. The controller uses the counter to perform wear-leveling in the flash storage device. In this process, the controller counts the number of erasures of each storage block and attempts to write data to those storage blocks that have a lower erasure count than the erasure count of other storage blocks. In this way, the lifetimes of individual storage blocks in the flash storage device, as well as the lifetime of the flash storage device, is increased. Because, each of the counters typically has a number of bits sufficient to count up to a predicted number of erasures before the storage block becomes defective, the counters consume significant area and power in a flash storage device.

In light of the above, a need exists for an improved system and method of performing wear-leveling in flash storage systems and devices.

SUMMARY

In various embodiments, a flash storage device performs wear-leveling on storage blocks in the flash storage device. The flash storage device includes a flash controller that tracks data errors occurring when dynamic data is read from a storage block of the flash storage device. If the number of data errors associated with the storage block exceeds a threshold value, the flash controller moves the dynamic data to an available storage block in the flash storage device. Additionally, the flash controller identifies a storage block in the flash storage device, which contains static data. The flash controller moves the static data to the storage block previously containing the dynamic data. Moving the static data to the storage block previously containing the dynamic data speculatively reduces the number subsequent erasures of that storage block, which increases the lifetimes of the storage block and the flash storage device.

A method of wear-leaving in a flash storage device, in accordance with one embodiment, includes reading a first data unit from a first storage block of a plurality of storage blocks in the flash storage device. The method also includes determining a data error has occurred as a result of reading the first data unit from the first storage block and determining the first data unit includes dynamic data. The method further includes correcting the data error in the first data unit, selecting an available storage block of the plurality of storage blocks, and moving the first data unit from the first storage block to the available storage block. Additionally, the method includes selecting a second storage block containing a second data unit including static data. Further, the method includes moving the second data unit from the second storage block to the first storage block.

A flash storage device, in accordance with one embodiment, includes a controller and a plurality of storage blocks. The controller is configured to read a first data unit from a first storage block of the plurality of storage blocks. The controller is also configured to determine a data error has occurred as a result of reading the first data unit from the first storage block, and determine the first data unit includes dynamic data. The controller is further configured to correct the data error in the first data unit, select an available storage block of the plurality of storage blocks, and move the first data unit from the first storage block to the available storage block. Additionally, the controller is configured to select a second storage block of the plurality of storage blocks. The second storage block contains a second data unit including static data. The controller is further configured to move the second data unit from the second storage block to the first storage block.

A flash storage system, in accordance with one embodiment, includes a controller and a plurality of flash storage devices. The plurality of flash storage devices include a plurality of storage blocks. The controller is configured to read a first data unit from a first storage block of the plurality of storage blocks. The controller is also configured to determine a data error has occurred as a result of reading the first data unit from the first storage block, and determining the first storage block is a dynamic storage block. The controller is further configured to correct the data error, select an available storage block of the plurality of storage blocks, and move the first data unit from the first storage block to the available storage block. Additionally, the controller is configured to select a second storage block of the plurality of storage blocks. The second storage block contains a second data unit including static data. The controller is further configured to move the second data unit from the second storage block to the first storage block.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DESCRIPTION

One indicator of wear in a storage block of the flash storage device is the number of erasures of the storage block. A storage block is erased in an erasure operation before data is written to the storage block in a write operation. Data that is written to a storage block in multiple write operations is referred to as dynamic data because the data changes in the storage block as a result of each of the write operations. Thus, a storage block that contains dynamic data is erased multiple times as a result of the multiple write operations. Although an erasure operation may be performed on a storage block after reading data from the storage block in a read operation, data is often remains in the storage block for subsequent read operations on the storage block. Data that remains unchanged in a storage block after the data is initially written to the storage block is referred to as static data. Once data is written to the storage block in a subsequent write operation, however, the data is referred to as dynamic data.

A data error that occurs when reading data from a storage block of a flash storage device is another indicator of wear in the storage block because such a data error often occurs after a large number of erasure operations have been performed on the storage block. Moreover, the storage block often becomes defective after a relatively smaller number of erasure operations are performed on the storage block after the data error occurs.

In various embodiments, a flash storage device performs wear-leveling by tracking data errors occurring when dynamic data is read from a storage block of the flash storage device and moving the dynamic data to an available storage block of the flash storage device. Additionally, the flash storage device identifies a storage block in the flash storage device containing static data and moves the static data to the storage block previously containing the dynamic data. In this way, the flash storage device speculatively reduces the number of subsequent erasure operations to the storage block previously containing the dynamic data, which increases the lifetime of the storage block and the flash storage device.

Figure 1:
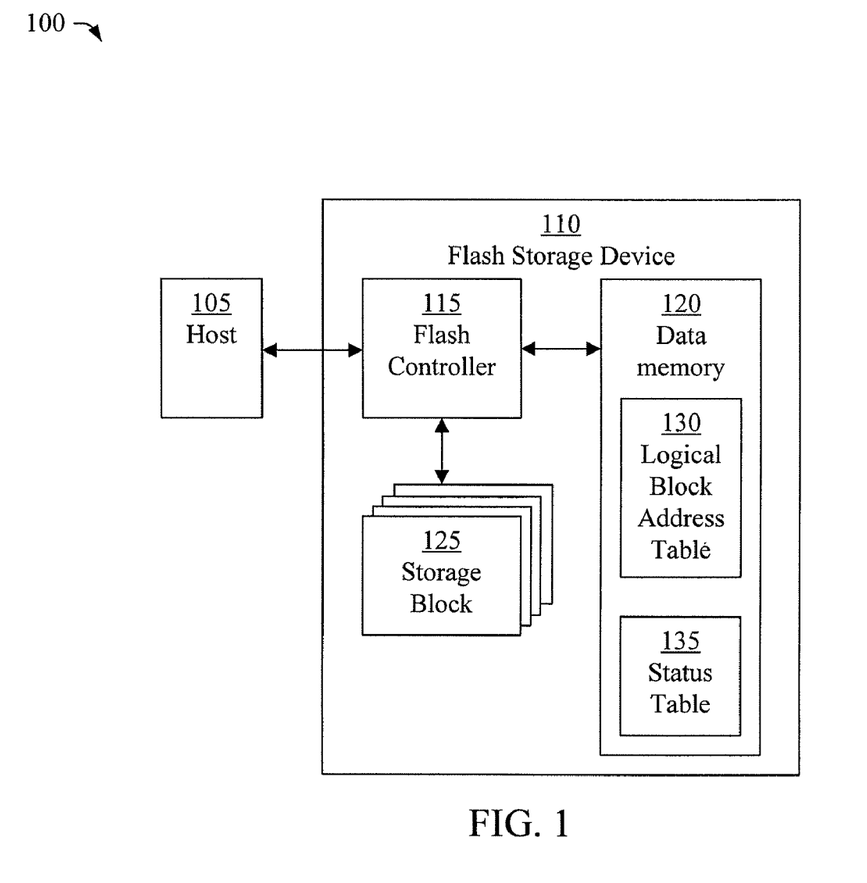
FIG. 1 is block diagram of an electronic system including a flash storage device, in accordance with an embodiment of the present invention.

FIG. 1 illustrates an electronic system 100, in accordance with an embodiment of the present invention. The electronic system 100 includes a flash storage device 110 and a host 105 coupled to the flash storage device 110. The host 105 writes data to the flash storage device 110 and reads data from the flash storage device 110. The flash storage device 110 includes a flash controller 115, a data memory 120, and storage blocks 125. The data memory 120 and the storage blocks 125 are each coupled to the flash controller 115. The flash storage device 110 also includes a logical block address table 130 and a status table 135. As illustrated in FIG. 1, the data memory 120 includes the logical block address table 130 and the status table 135. In other embodiments, the logical block address table 130 or the status table 135, or both, may be external of the data memory 120. For example, the flash controller 115 or the storage blocks 125 may include the logical block address table 130 or the status table 135, or both, in other embodiments.

The host 105 may be any computing or electronic device, such as a computer workstation, an embedded computing system, a network router, a portable computer, a personal digital assistant, a digital camera, a digital phone, or the like. The flash controller 115 may include a microprocessor, a microcontroller, an embedded controller, a logic circuit, software, firmware, or any kind of processing device. The flash storage device 110 may be any type of flash storage, such as a flash storage system, a solid-state drive, a flash memory card, a secure digital (SD) card, a universal serial bus (USB) memory device, a flash storage array, a CompactFlash card, SmartMedia, a flash storage array, or the like.

The data memory 120 may be any memory, computing device, or system capable of storing data. For example, the data memory 120 may be a random access memory (RAM), a dynamic random access memory (DRAM), a static random access memory (SRAM), a synchronous dynamic random access memory (SDRAM), a flash storage, an erasable programmable read-only-memory (EPROM), an electrically erasable programmable read-only-memory (EEPROM), or the like.

Each of the storage blocks 125 may be any type of non-volatile storage such as, for example, a flash storage block. Each of the storage blocks 125 has a data size, which determines the capacity of the storage block 125 to store data. For example, the data size of a storage block 125 may be a data bit, a data byte, a data word, a data block, a data record, a data file, a data sector, a memory page, a logic sector, or a file sector, or any other unit of data. Although four storage blocks 125 are illustrated in FIG. 1, the flash storage device 110 may have more or fewer storage blocks 125 in other embodiments. In one embodiment, the flash storage device 110 includes two-hundred fifty-six storage blocks 125

In various embodiments, the flash controller 115 writes data (e.g., data units) to the data memory 120 and the storage blocks 125 and reads data from the data memory 120 and the storage blocks 125. Additionally, the flash controller 115 generates error correction codes (ECC) for data in the flash storage device 110. In one embodiment, the flash controller 115 generates an error correction code (ECC) for data in the flash storage device 110 in conjunction with performing a write operation for writing the data to a storage block 125. Further, the flash controller 115 writes the error correction code associated with the data to the storage block 125. The flash controller 115 uses the error correction codes to determine whether data errors occur when the flash controller 115 reads data from the storage blocks 125. A data error occurs if one or more data bits of the data read from the storage blocks 125 by the flash controller 115 are corrupt. If a data error occurs when the flash controller 115 reads data from the storage blocks 125, the flash controller 115 corrects the data error in the data by using the error correction code previously generated for the data.

The flash controller 115 maintains a count of the number of data errors occurring in read operations for each of the storage blocks 125. If the flash controller 115 determines the number of data errors occurring in read operations of a given storage block 125 containing dynamic data exceeds a threshold value, the flash controller 115 selects an available storage block 125 and moves the dynamic data to the available storage block 125. Further, the flash controller 115 select a storage block 125 containing static data and moves the static data to the storage block 125 previously containing the dynamic data. In this way, the controller performs wear-leveling in the flash storage device 110.

In some embodiments, the flash storage device 110 includes spare storage blocks 125 for replacement of any defective storage blocks 125 in the flash storage device 110. In these embodiments, The flash controller 115 determines whether any of the storage blocks 125 are defective and maps the logical block address 200 of the flash storage device 110 associated with such a defective storage block 125 to the physical block address 205 of a spare storage block 125.

Figure 2:
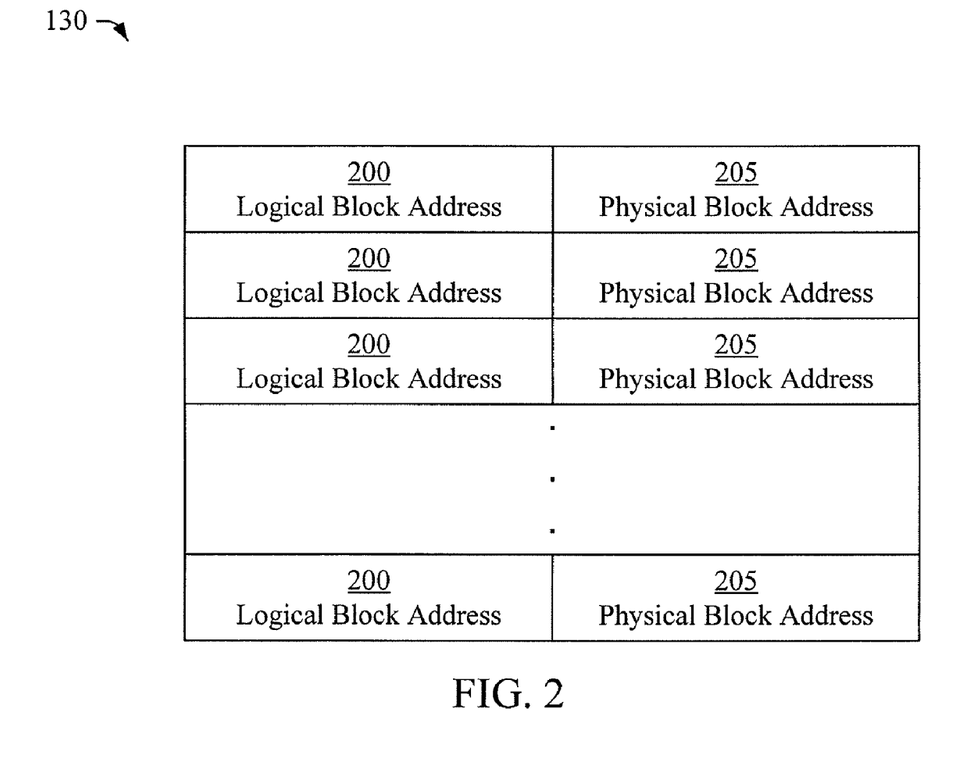
FIG. 2 is a block diagram of a logical block address table, in accordance with an embodiment of the present invention.

FIG. 2 illustrates the logical block address table 130, in accordance with an embodiment of the present invention. The logical block address table 130 includes logical block address 200 of the flash storage device 110 and physical block addresses 205 of storage blocks 125 in the flash storage device 110. The logical block address table 130 maps logical block addresses 200 of the flash storage device 110 to physical cal block addresses 205 of the storage blocks 125. In other embodiments, the logical block address table 130 may be another data structure, or may include software, or hardware, or both, that maps the logical block addresses 200 of the flash storage device 110 to the physical block addresses 205 of storage blocks 125 in the flash storage device 110.

Figure 3:
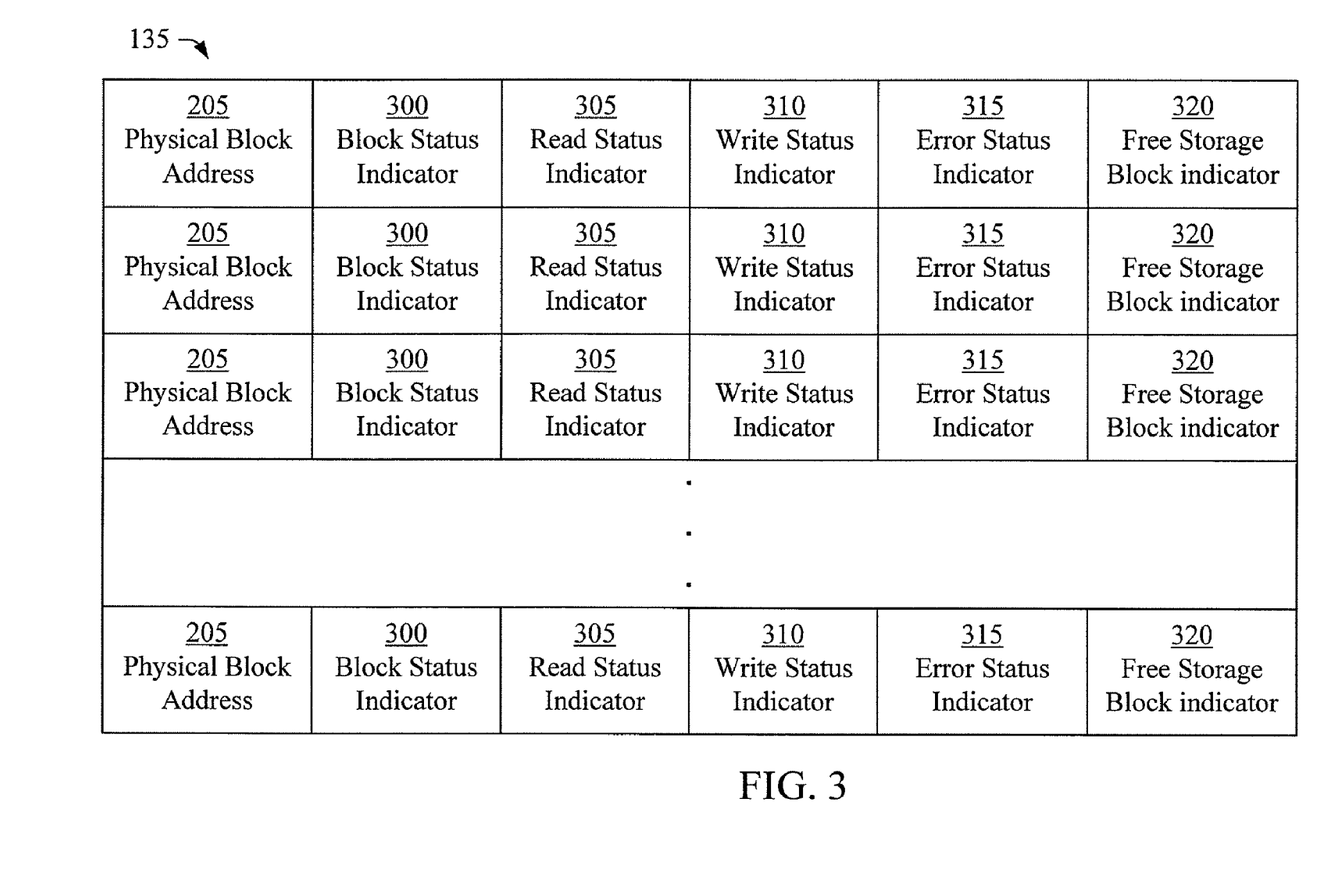
FIG. 3 is a block diagram of a status table, in accordance with an embodiment of the present invention.

FIG. 3 illustrates the status table 135, in accordance with an embodiment of the present invention. The status table 135 includes a physical block address 205, a block status indicator 300, a read status indicator 305, a write status indicator 310, and an error status indicator 315 for each of the storage blocks 125. In other embodiments, the status table 135 may be another data structure, or may include software, or hardware. The block status indicator 300 of a storage block 125 indicates whether the storage block 125 is defective. In operation, the flash controller 115 determines if a storage block 125 is defective. If the storage block 125 is defective, the flash controller 115 replaces the defective storage block 125 with a spare storage block 125 and sets the block status indicator 300 of the defective storage block 125 to indicate that the defective storage block 125 is defective.

The read status indicator 305 indicates whether the flash controller 115 has read data from the storage block 125 since the flash storage device 110 was last powered-on. The write status indicator 310 indicates whether the flash controller 115 has written data to the storage block 125 since the flash storage device 110 was last powered-on. If the write status indicator 310 of a storage block 125 indicates the flash controller 115 has written data to the storage block 125 since the flash storage device 110 was last powered-on, the storage block 125 is deemed to contain dynamic data. If the write status indicator 310 of a storage block 125 indicates the flash controller 115 has not performed written data to the storage block 125 since the flash storage device 110 was last powered-on, the storage block 125 is deemed to contain static data. The error status indicator 315 of a storage block 125 indicates the number of data errors that have occurred as a result the flash controller 115 reading data from the storage block 125. In an alternative embodiment, the error status indicator 315 of a storage block 125 indicates the number of data errors that have occurred as a result of the flash controller 115 reading data from the storage block 125 since the flash storage device 110 was last powered-on.

In one embodiment, the flash controller 115 resets the read status indicator 305 and the write status indicator 310 after the flash storage device 110 is powered-on and before data the flash controller 115 reads data from, or writes data to, the storage blocks 125. For example, each of the read status indicator 305 and the write status indicator 310 may include a data bit and the flash controller 115 sets each of these data bits to a value of zero. In a further embodiment, the flash controller 115 resets the error status indicator 315 after the flash storage device 110 is powered-on but before the flash controller 115 reads data from, or writes data to, the storage blocks 125. For example, the error status indicator 315 may include one or more data bits and the flash controller 115 sets each of these data bits to a value of zero. In this embodiment, the error status indicator 315 indicates the number of data errors that have occurred as a result the flash controller 115 reading data from the storage block 125 since the flash storage device 110 was last powered-on.

In some embodiments, the status table 135 also includes an optional free storage block indicator 320. The free storage block indicator 320 contains the physical block address 205 of an available storage block 125 in the flash storage device 110. In one embodiment, the free storage block indicator 320 is set during manufacture of the flash storage device 110 to contain the physical block address 205 of an available storage block 125, such as a spare storage block 125, in the flash storage device 110. In this embodiment, the free storage block indicator 320 also indicates whether the storage block 125 associated with the physical block address 205 in the free storage block indicator 320 is available.

In other embodiments, the flash controller 115 identifies an available storage block 125, such as spare storage block 125, when the storage block 125 associated with the physical block address 205 in the free storage block indicator 320 is used and becomes unavailable. In these embodiments, the controller updates the free storage indictor 320 to contain the physical block address 205 of the identified storage block 125 identified. Although only one free storage block indicator 320 is illustrated in FIG. 3, the status table 135 may contain more than one free storage block indicator 320 in other embodiments.

In various embodiments, the flash controller 115 receives an operation from the host 105, which may be a read operation or a write operation, among others. Each of the read or write operations includes a logical block address 200 of the flash storage device 110. Additionally, a write operation includes a data unit. For example, a data unit may be a data bit, a data byte, a data word, a data block, a data record, a data file, a data sector, a memory page, a logic sector, or a file sector, or any other unit of data. If the operation received from the host 105 is a write operation, the flash controller 115 determines the physical block address 205 of a storage block 125 based on the logical block address 200 of the write operation and the logical block address table 130. The flash controller 115 then writes the data unit of the write operation to the storage block 125 based on the physical block address 205 of that storage block 125. Additionally, the flash controller 115 sets the write status indicator 310 in the status table 135 for that storage block 125 to indicate the flash controller 115 has written data to the storage block 125. For example, the flash controller 115 may set a data bit of the read status indicator 305 to a value of one.

If the operation received from the host 105 is a read operation, the flash controller 115 determines the physical block address 205 of a storage block 125 based on the logical block address 200 of the write operation and the logical block address table 130. The flash controller 115 then reads a data unit from the storage block 125 based on the physical block address 205 of that storage block 125 and provides the data unit to the host 105. Additionally, the flash controller 115 sets the read status indicator 305 in the status table 135 for that storage block 125 to indicate the flash controller 115 has read data from the storage block 125. For example, the flash controller 115 may set a data bit of the read status indicator 305 to a value of one.

Additionally, the flash controller 115 determines whether a data error occurs as a result of the read operation on the storage block 125. If a data error occurs as a result of the read operation on the storage block 125, the flash controller 115 corrects the data error in the data unit by using the error correction code previously generated for the data unit. The flash controller 115 then provides the data unit, which has been corrected, to the host 105. Additionally, the flash controller 115 updates the error status indicator 315 of the storage block 125 to indicate a new count of the number of data errors occurring in read operations for the storage block 125. For example, the flash controller 115 may modify one or more data bits of the error status indicator 315 to increment the count of the error status indicator 315.

If a data error occurs as a result of the read operation on a storage block 125, the flash controller 115 determines whether the storage block 125 contains dynamic data. In this process, the flash controller 115 determines whether the count in the error status indicator 315 of the storage block 125 exceeds a threshold value and whether the write status indicator 310 of the storage block 125 is set. If the count in the error status indicator 315 of the storage block 125 exceeds the threshold value and the write status indicator 310 of the storage block 125 is set, the controller deems the storage block 125 to be a dynamic storage block 125. Additionally, the flash controller 115 selects an available storage block 125, writes the data unit from the static storage block 125 to the selected storage block 125, erases the static storage block 125, and updates the logical block address table 130 such that the physical address associated with the dynamic storage block 125 is mapped to the selected storage block 125. In this way, the flash controller 115 moves the dynamic data from the dynamic storage block 125 to the selected storage block 125.

In addition to moving the data from the dynamic storage block 125 to the selected storage block 125, the flash controller 115 identifies a storage block 125 containing static data. In one embodiment, the flash controller 115 identifies the storage block 125 containing the static data by identifying a write status indicator 310 associated with the storage block 125 that is not set in the status table 135. In another embodiment, the flash controller 115 identifies the storage block 125 containing the static data by identifying a write status indicator 310 associated with the storage block 125 that is not set in the status table 135 and a read status indicator 305 associated with the storage block 125 that is set in the status table 135. The flash controller 115 then deems the identified storage block 125 to be a static storage block 125. The flash controller 115 then reads the static data from the static storage block 125 and writes the data to the dynamic storage block 125 previously containing the dynamic data. Additionally, the flash controller 115 updates the logical block address table 130 such that the physical address associated with the static storage block 125 is mapped to the dynamic storage block 125. In some embodiments, the flash controller 115 also erases the static storage block 125.

In some instances, the write status indicators 315 of each of the storage blocks 125 in the flash storage device 110 may become set. In one embodiment, the flash controller 115 determines the write status indicator 315 of each of the storage blocks 125 in the flash storage device 110 is set based on the status table 135. In this embodiment, the flash controller 115 then identifies the storage block containing static data by identifying an error status indicator 315 associated with the storage block 125 that has a count less than the current threshold value.

In some instances, the error status indicators 315 of each of the storage blocks 125 in the flash storage device 110 may become set. In one embodiment, the flash controller 115 determines the error status indicator 315 of each of the storage blocks 125 in the flash storage device 110 is set based on the status table 135. In this embodiment, the flash controller 115 then increased the threshold value.

Figure 4:
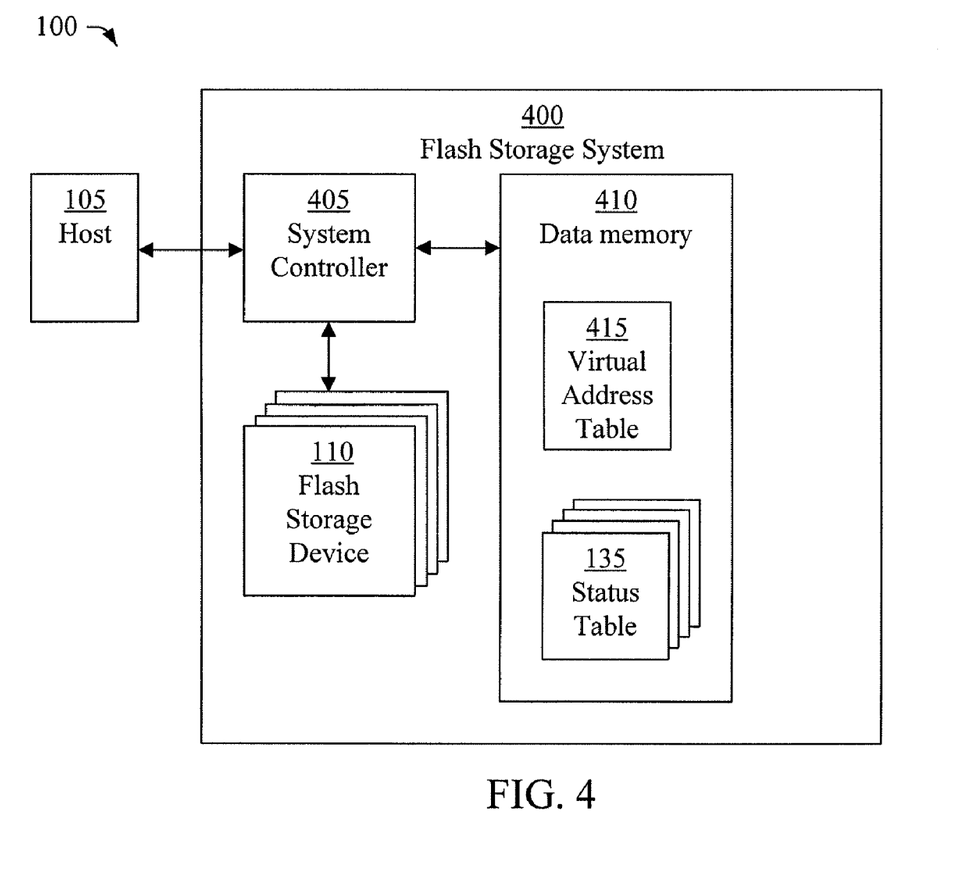
FIG. 4 illustrates an electronic system, in accordance with an embodiment of the present invention.

FIG. 4 illustrates the electronic system 100, in accordance with another embodiment of the present invention. The electronic system 100 includes a flash storage system 400. The flash storage system 400 includes a system controller 405, a data memory 410, and multiple flash storage devices 110. The system controller 405 is coupled to the host 105, the data memory 410, and to each of the flash storage devices 110. The system controller 405 may include a microprocessor, a microcontroller, an embedded controller, a logic circuit, software, firmware, or any kind of processing device. The data memory 410 may be any memory, computing device, or system capable of storing data. For example, the data memory 410 may be a random access memory (RAM), a dynamic random access memory (DRAM), a static random access memory (SRAM), a synchronous dynamic random access memory (SDRAM), a flash storage, an erasable programmable read-only-memory (EPROM), an electrically erasable programmable read-only-memory (EEPROM), or the like.

The data memory 410 includes the status table 135 of each of the flash storage devices 110 and a virtual address table 415. In this embodiment, the system controller 405 instead of the individual flash controllers 115 maintains the status tables 135 of the flash storage devices 110. Although four flash storage devices 110 and four status tables 135 are illustrated in FIG. 4, the flash storage system 400 may have more or fewer flash storage devices 110 or status tables 135, or both, in other embodiments.

Figure 5:
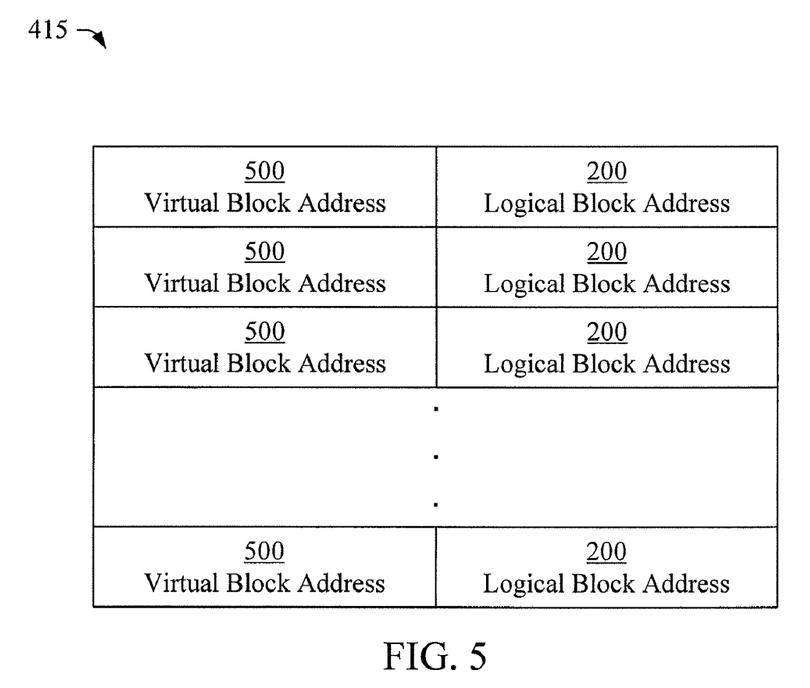
FIG. 5 is a block diagram of a virtual address table, in accordance with an embodiment of the present invention.

FIG. 5 illustrates the virtual address table 415, in accordance with an embodiment of the present invention. The virtual address table 415 contains virtual addresses 500 in addition to the logical block addresses 200 of the flash storage devices 110. The virtual address table 415 maps virtual addresses 500 to logical block addresses 200 of the flash storage devices 110. In various embodiments, the system controller 405 receives operations including virtual addresses 500 from the host 105 and uses the virtual address table 415 to identify physical addresses of the flash storage devices 110.

In one embodiment, if the system controller 405 determines a data error has occurred as a result of a read operation in a flash storage device 110, the system controller 405 selects an available storage block 125 in the same flash storage device 110. In another embodiment, if the system controller 405 determines a data error has occurred as a result of a read operation in a dynamic storage block 125 of a flash storage device 110, the system controller 405 selects an available storage block 125 in another flash storage device 110. The system controller 405 may select the available storage block 125 if the flash storage device 110 containing the dynamic storage block 125 does not have an available storage block 125 or to perform wear-leveling among the flash storage devices 110. The system controller 405 then moves the data unit in the dynamical storage block 125 to the available storage block 125 of the selected flash storage device 110. Additionally, the system controller 405 uses the virtual address table 415 to map the virtual address 500 associated with the dynamic storage block 125 to the available storage block 125 in the selected flash storage device 110.

Figure 6:
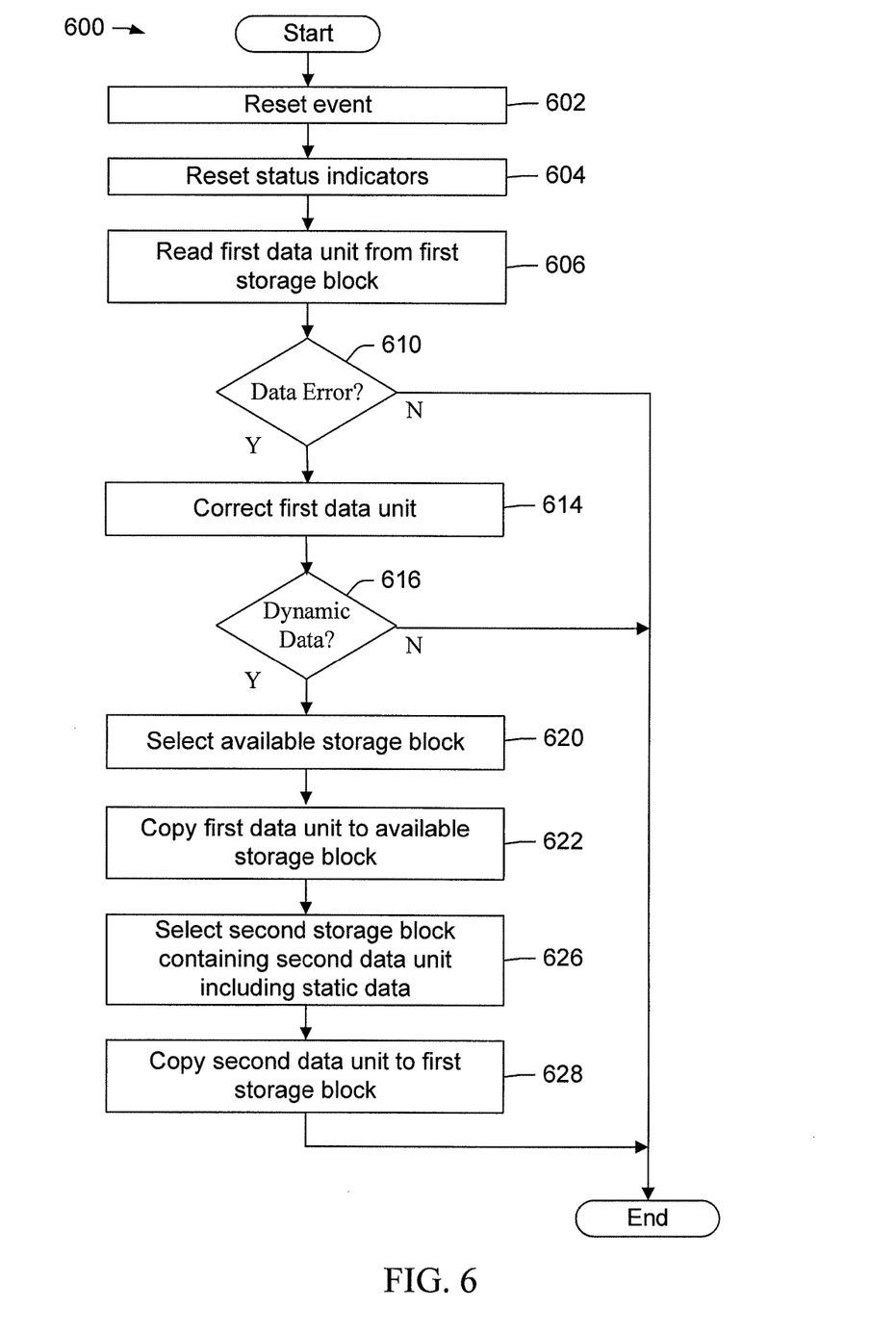
FIG. 6 is a flow chart for a method of wear-leveling in a flash storage device, in accordance with an embodiment of the present invention.

FIG. 6 illustrates a method 600 of wear-leveling in the flash storage device 100, in accordance with an embodiment of the present invention. In step 602, the flash storage device 110 is powered-on. The method 600 then proceeds to step 604.

In step 604, the controller 115 resets the read status indicators 305 and the write status indicators 310 in the status table 135. In one embodiment, the flash controller 115 also resets the error status indicators 315 in the status table 135. The method 600 then proceeds to step 606.

In step 606, the flash controller 115 reads a first data unit from a first storage block 125 in the flash storage device 110. In one embodiment, the flash controller 115 receives a read operation from the host 105 and performs the read operation on the first storage block 125 to read the first data unit from the storage block 125, as is described more fully herein. The method 600 then proceeds to step 610.

In step 610, the flash controller 115 determines whether a data error has occurred as a result of reading the first data unit from the first storage block 125. If the controller determines a data error has occurred as a result of reading the first data unit from the first storage block 125, the method 600 proceeds to step 614, otherwise the method 600 ends.

In step 614, arrived at from the determination in step 610 that a data error has occurred in the first data unit, the flash controller 115 determines whether the first data unit includes dynamic data. In one embodiment, the flash controller 115 determines the first data unit contains dynamic data if the count in the error status indicator 315 of the first block 125 exceeds the threshold value and the write status signal 310 of the storage block 125 is set. If the flash controller 115 determines the first data unit contains dynamic data, the method 600 proceeds to step 616, otherwise the method 600 ends.

In step 616, the flash controller 115 corrects the data error in the first data unit. In one embodiment, the flash controller 115 uses an error correction code preciously generated for the first data unit to correct the data error in the first data unit. The method 600 then proceeds to step 620.

In step 620, the flash controller 115 selects an available storage block 125 in the flash storage device 110. For example, the available storage block 125 may be a spare storage block 125 in the flash storage device 110. In one embodiment, the flash controller 115 uses a free storage block indicator 320 in the status table 135 to select the available storage block 125. The method 600 then proceeds to step 622.

In step 622, the flash controller 115 moves the data unit, which as been corrected in step 616, to the selected storage block 125. Additionally, the flash controller 115 updates the logical block address table 130. In this process, the flash controller 115 identifies the logical block address 200 that is mapped to the first storage block 125 and maps the logical block address 200 to the available storage block 125. The method 600 then proceeds to step 626.

In step 626, the flash controller 115 selects a second storage block 125 in the flash storage device 110, which contains a second data unit including static data. In one embodiment, the flash controller 115 selects the second storage block 125 by identifying a write status indicator 310 that is not set in the status table 135 and identifying the storage block 125 associated with the write status indicator 310. In another embodiment, the flash controller 115 selects the second storage block 125 by identifying a write status indicator 310 that is not set and a read status indicator 305 that is set in the status table 135, and identifying the storage block 125 associated with the write status indicator 310 and the read status indicator 305. The method 600 then proceeds to step 628.

In step 628, the flash controller 115 moves the second data unit from the second storage block 125 to the first storage block 125. Additionally, the flash controller 115 updates the logical block address table 130. In this process, the flash controller 115 identifies the logical block address 200 that is mapped to the second storage block 125 and maps the logical block address 200 to the first storage block 125. In one embodiment, the flash controller 115 then erases the second storage block 125. The method 600 then ends.

In various embodiments, the steps of the method 600 may be performed in a different order than that described above with reference to FIG. 6. In some embodiments, the method 600 may include more or fewer steps than those steps illustrated in FIG. 6. In other embodiments, some or all of the steps of the method 600 may be performed in parallel with each other or substantially simultaneously with each other.

Figure 7:
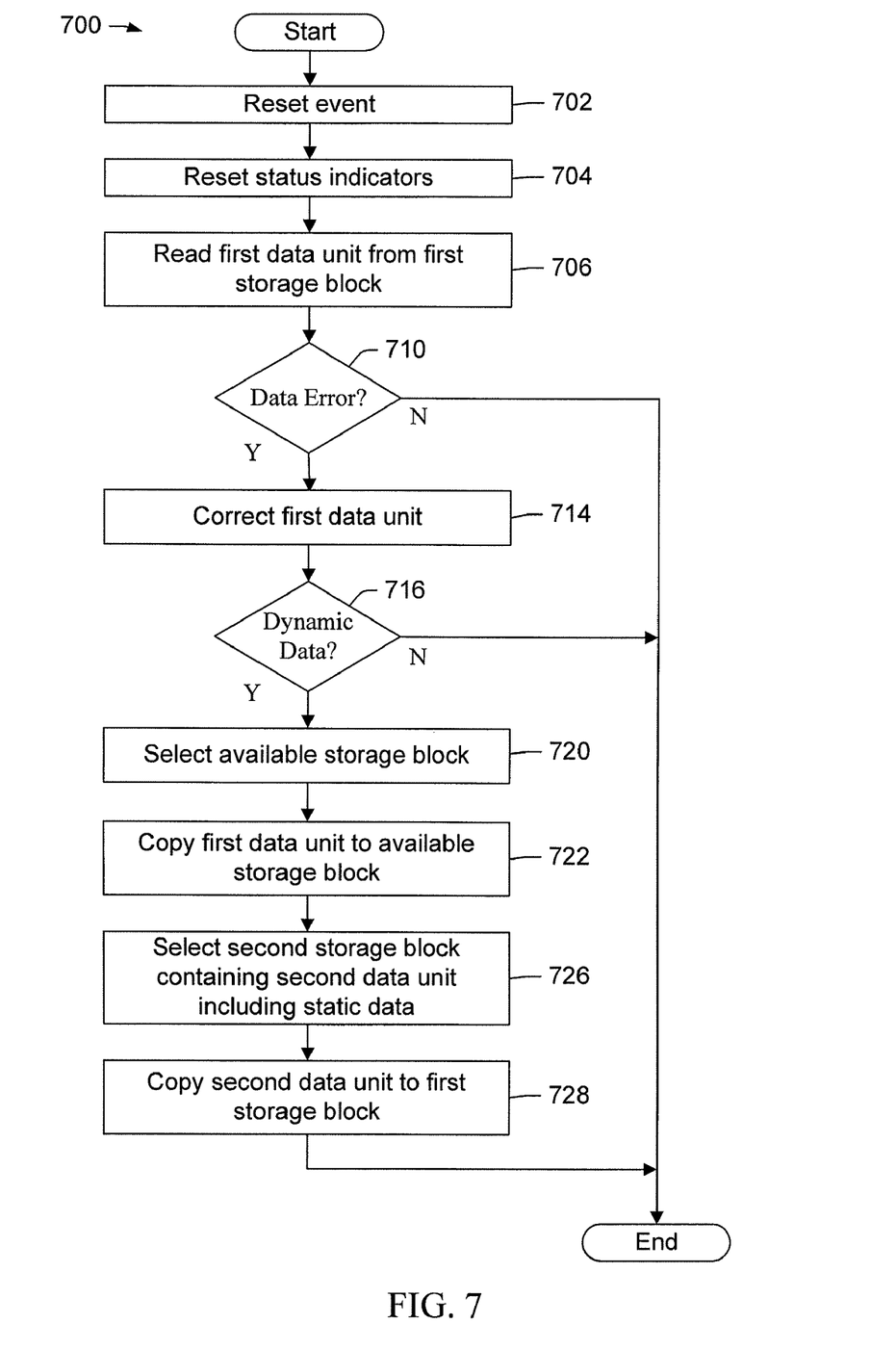
FIG. 7 is a flow chart for a method of wear-leveling in a flash storage system, in accordance with an embodiment of the present invention.

FIG. 7 illustrates a method 700 of wear-leveling in the flash storage system 400, in accordance with an embodiment of the present invention. In step 702, the flash storage system 400 is powered-on. The method 700 then proceeds to step 704.

In step 704, the system controller 405 resets the read status indicators 305 and the write status indicators 310 in the status tables 135. In one embodiment, the system controller 405 also resets the error status indicators 315 in the status tables 135. The method 700 then proceeds to step 706.

In step 706, the system controller 405 reads a first data unit from a first storage block 125 in the flash storage device 110. In one embodiment, the system controller 405 receives a read operation from the host 105 and performs the read operation on the first storage block 125 to read the first data unit from the storage block 125, as is described more fully herein. The method 700 then proceeds to step 710.

In step 710, the system controller 405 determines whether a data error has occurred as a result of reading the first data unit from the first storage block 125. If the system controller 405 determines a data error has occurred as a result of reading the first data unit from the first storage block 125, the method 700 proceeds to step 714, otherwise the method 700 ends.

In step 714, arrived at from the determination in step 710 that a data error has occurred, the system controller 405 determines whether the first data unit includes dynamic data. In one embodiment, the system controller 405 determines the first data unit includes dynamic data if the count in the error status indicator 315 of the first storage block 125 exceeds the threshold value and the write status indicator 310 of the first storage block 125 is set. If the system controller 405 determines the first data unit contains dynamic data, the method 700 proceeds to step 716, otherwise the method 700 ends.

In step 716, arrived at from the determination in step 714 that a data error has occurred in the first data unit, the system controller 405 corrects the data error in the first data unit. In one embodiment, the system controller 405 uses an error correction code previously generated for the first data unit to correct the data error in the first data unit. The method 700 then proceeds to step 720.

In step 720, the system controller 405 selects an available storage block 125 in one of the flash storage devices 110. For example, the available storage block 125 may be a spare storage block 125 in the selected flash storage device 110. In one embodiment, the system controller 405 uses a free storage block indicator 320 in the status table 135 to select the available storage block 125. The method 700 then proceeds to step 722.

In step 722, the system controller 405 moves the data unit, which has been corrected in step 716, to the available storage block 125. Additionally, the system controller 405 updates the virtual address table 415. In this process, the system controller 405 identifies the virtual address 500 that is mapped to the first storage block 125 and maps the virtual address 500 to the available storage block 125. The method 700 then proceeds to step 726.

In step 726, the system controller 405 selects a storage block 125 in one of the flash storage devices 110, which contains a second data unit including static data. In one embodiment, the system controller 405 selects the second storage block 125 by identifying a write status indicator 310 that is not set in the status table 135 and identifying the storage block 125 associated with the write status indicator 310. In another embodiment, the system controller 405 selects the second storage block 125 by identifying a write status indicator 310 that is not set in the status table 135 and a read status indicator 305 that is set in the status table 135, and identifying the storage block 125 associated with the write status indicator 310 and the read status indicator 305. The method 700 then proceeds to step 728.

In step 728, the system controller 405 moves the second data unit from the second storage block 125 to the first storage block 125. Additionally, the system controller 405 updates the virtual address table 415. In this process, the system controller 405 identifies the virtual address 500 that is mapped to the second storage block 125 and maps the virtual address 500 to the first storage block 125. In one embodiment, the system controller 405 also erases the second storage block 125. The method 700 then ends.

In various embodiments, the steps of the method 700 may be performed in a different order than that described above with reference to FIG. 7. In some embodiments, the method 700 may include more or fewer steps than those steps illustrated in FIG. 7. In other embodiments, some or all of the steps of the method 700 may be performed in parallel with each other or substantially simultaneously with each other.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A method of wear-leveling in a flash storage device, the method comprising:
    reading a first data unit from a first storage block of a plurality of storage blocks in the flash storage device;
    determining a data error has occurred in the first data unit as a result of reading the first data unit from the first storage block;
    determining the first data unit includes dynamic data;
    correcting the data error in the first data unit;
    selecting an available storage block of the plurality of storage blocks;
    moving the first data unit from the first storage block to the available storage block;
    selecting a second storage block of the plurality of storage blocks, the second storage block containing a second data unit including static data; and
    moving the second data unit to the first storage block.

2. The method of claim 1, wherein the first data unit is associated with an address mapped to the first storage block before the first data unit is moved to the second storage block, and wherein moving the first data unit from the first data block to the available storage block comprises mapping the address associated with the first data unit to the available storage block.

3. The method of claim 1, wherein the second data unit is associated with an address mapped to the second storage block before the second data unit is moved to the first storage block, and wherein moving the second data unit to the first storage block comprises mapping the address associated with the second data unit to the first storage block.

4. The method of claim 1, wherein correcting the data error in the first data unit is performed by using an error correction code.

5. The method of claim 1, further comprising setting a status indicator for each storage block of the plurality of storage blocks indicating whether a data unit has been written to the storage block since the flash storage device was last powered-on, wherein selecting the second storage block is based on the status indictor of the second storage block, the status indicator of the second storage block indicating a data unit has not been written to the second storage block since the flash storage device was last powered-on.

6. The method of claim 1, further comprising setting a status indicator for each storage block of the plurality of storage blocks indicating a count of the number of data errors occurring as a result of a data unit being read from the storage block, wherein determining the first data unit includes dynamic data comprises determining the count of the status indicator of the first storage block exceeds a threshold value.

7. The method of claim 1, further comprising setting a status indicator for each storage block of the plurality of storage blocks indicating a count of the number of data errors occurring as a result of a data unit being read from the storage block since the flash storage device was last powered-on, wherein determining the first data unit includes dynamic data comprises determining the count of the status indicator of the first storage block exceeds a threshold value.

8. The method of claim 1, further comprising:
    setting a first status indicator for each storage block of the plurality of storage blocks indicating whether a data unit has been written to the storage block since the flash storage device was last powered-on;
    setting a second status indicator for each storage block of the plurality of storage blocks indicating a count of the number of data errors occurring as a result of a data unit being read from the storage block; and
    determining a data unit has been written to each storage block of the plurality of storage blocks since the flash storage device was last powered-on based on the first status indicator of the storage block, wherein selecting the second storage block is based on the second status indictor, the second status indicator of the second storage block indicating the count of the number of data errors occurring as a result of a data unit being read from the second storage block does not exceed the threshold value.

9. The method of claim 1, further comprising:
    setting a first status indicator for each storage block of the plurality of storage blocks indicating whether a data unit has been written to the storage block since the flash storage device was last powered-on;
    setting a second status indicator for each storage block of the plurality of storage blocks indicating a count of the number of data errors occurring as a result of a data unit being read from the storage block since the flash storage device was last powered-on; and
    determining a data unit has been written to each storage block of the plurality of storage blocks since the flash storage device was last powered-on based on the first status indicator of the storage block, wherein selecting the second storage block is based on the second status indictor, the second status indicator of the second storage block indicating the count of the number of data errors occurring as a result of a data unit being read from the second storage block since the flash storage device was last powered-on does not exceed the threshold value.

10. The method of claim 1, further comprising:
    setting a first status indicator for each storage block of the plurality of storage blocks indicating whether a data unit has been written to the storage block since the flash storage device was last powered-on;
    setting a second status indicator for each storage block of the plurality of storage blocks indicating a count of the number of data errors occurring as a result of a data unit being read from the storage block;
    determining a data unit has been written to each storage block of the plurality of storage blocks since the flash storage device is powered on based on the first status indicator of the storage block;
    determining the count of the second status indicator of each storage block of the plurality of storage blocks exceeds the threshold value; and modifying the threshold value to cause the count of the second status indicator of at least one storage block of the plurality of storage blocks not to exceed the threshold value.

11. The method of claim 1, further comprising:
setting a first status indicator for each storage block of the plurality of storage blocks indicating whether a data unit has been written to the storage block since the flash storage device was last powered-on;
setting a second status indicator for each storage block of the plurality of storage blocks indicating a count of the number of data errors occurring as a result of a data unit being read from the storage block since the flash storage device was last powered-on;
determining a data unit has been written to each storage block of the plurality of storage blocks since the flash storage device was last powered-on based on the first status indicator of the storage block;
determining the count of the second status indicator of each storage block of the plurality of storage blocks exceeds the threshold value; and
modifying the threshold value to cause the count of the second status indicator of at least one storage block of the plurality of storage blocks not to exceed the threshold value.

12. The method of claim 1, wherein moving the first data unit from the first storage block to the first storage block comprises:
writing the first data unit to the available storage block after correcting the data error in the first data unit; and
erasing the first storage block.

13. The method of claim 1, wherein moving the second data unit from the second storage block to the first storage block comprises:
reading the second data unit from the second storage block; and
writing the second data unit to the first storage block.

14. A flash storage device, comprising:
a flash storage device comprising a plurality of storage blocks;
a controller configured to read a first data unit from a first storage block of the plurality of storage blocks, determine a data error has occurred as a result of reading the first data unit from the first storage block, determine the first data unit includes dynamic data, select an available storage block of the plurality of storage blocks, move the first data unit from the first storage block to the available storage block, and select a second storage block of the plurality of storage blocks, the second storage block containing a second data unit including static data, the controller further configured to move the second data unit from the second storage block to the first storage block.

15. The flash storage device of claim 14, further comprising a first status indicator for each storage block of the plurality of storage blocks for indicating a count of the number of data errors occurring as a result of a data unit being read from the storage block, the controller further configured to determine whether the count of the first status indicator of the first storage block exceeds a threshold value.

16. The flash storage device of claim 15, further comprising a second status indicator for each storage block of the plurality of storage blocks for indicating whether a data unit has been written to the storage block since the flash storage device has been powered on, the controller further configured to select the second storage block based on both the first status indictor and the second status signal of the second storage block.

17. The flash storage device of claim 15, wherein the controller is further configured to determine whether the count of the second status indicator of each storage block of the plurality of storage blocks exceeds the threshold value and to modify the threshold value to cause the count of the second status indicator of at least one storage block of the plurality of storage blocks not to exceed the threshold value.

18. A flash storage system comprising:
a plurality of flash storage devices comprising a plurality of storage blocks;
a controller configured to read a first data unit from a first storage block of the plurality of storage blocks, determine a data error has occurred as a result of reading the first data unit from the first storage block, determine the first data unit includes dynamic data, select an available storage block of the plurality of storage blocks, move the first data unit from the first storage block to the available storage block, and select a second storage block of the plurality of storage blocks, the second storage block containing a second data unit including static data, the controller further configured to move the second data unit from the second storage block to the first storage block.

19. The flash storage system of claim 18, further comprising a first status indicator for each storage block of the plurality of storage blocks for indicating a count of the number of data errors occurring as a result of a data unit being read from the storage block, the controller further configured to determine whether the count of the first status indicator of the first storage block exceeds a threshold value.

20. The flash storage system of claim 18, further comprising a second status indicator for each storage block of the plurality of storage blocks for indicating whether a data unit has been written to the storage block since the flash storage device has been powered-on, the controller further configured to select the second storage block based on both the first status indictor and the second status signal of the second storage block.

* * * * *